(12) United States Patent
Akatsuka et al.

(10) Patent No.: US 9,976,515 B2
(45) Date of Patent: May 22, 2018

(54) EXHAUST NOZZLE AND METHOD FOR CHANGING EXHAUST FLOW PATH

(71) Applicant: JAPAN AEROSPACE EXPLORATION AGENCY, Chofu-shi, Tokyo (JP)

(72) Inventors: Junichi Akatsuka, Chofu (JP); Yasushi Watanabe, Chofu (JP)

(73) Assignee: JAPAN AEROSPACE EXPLORATION AGENCY, Tokyo (JP)

(*) Notice: Subject to any disclaimer, the term of this patent is extended or adjusted under 35 U.S.C. 154(b) by 501 days.

(21) Appl. No.: 14/271,584

(22) Filed: May 7, 2014

(65) Prior Publication Data

US 2015/0048177 A1 Feb. 19, 2015

(30) Foreign Application Priority Data

Aug. 19, 2013 (JP) ................................ 2013-169712

(51) Int. Cl.
*F02K 1/08* (2006.01)
*F02K 1/46* (2006.01)

(52) U.S. Cl.
CPC .................. *F02K 1/08* (2013.01); *F02K 1/46* (2013.01); *Y02T 50/671* (2013.01)

(58) Field of Classification Search
CPC ... F02K 1/383; F02K 1/48; F02K 1/50; F02K 1/08; F02K 1/085; F02K 1/46
(Continued)

(56) References Cited

U.S. PATENT DOCUMENTS 2,546,293 A * 3/1951 Berliner .................... F02K 1/40
239/265.43
2,593,420 A * 4/1952 Diehl ........................ F02K 1/10
138/45
(Continued)

FOREIGN PATENT DOCUMENTS

JP 07-208262 A 8/1995
JP 2007-218255 A 8/2007
(Continued)

OTHER PUBLICATIONS

Oishi, Tsutomu, "Jet Noise Reduction by Notched Nozzle on Japanese ECO engine project", 16th AIAA/CEAS 2010-4026, American Institute of Aeronautics and Astronautics, 2010.
(Continued)

*Primary Examiner* — Ted Kim
(74) *Attorney, Agent, or Firm* — Westerman, Hattori, Daniels & Adrian, LLP

(57) ABSTRACT

Provided is an exhaust nozzle and a method for changing an exhaust flowpath, whereby noise can be reduced by using a simple and light-weight mechanism without increasing the complexity and size of the structure of the exhaust nozzle, and furthermore, the efficiency during cruising at supersonic speeds can be improved. The rear end side of main nozzle pieces 110 of an exhaust nozzle 100 are provided swingably in an inward and outward direction of an exhaust flow path 101, about an open/close bend section 111 to the rear of an engine, coupling nozzle pieces 120 are coupled bendably to adjacent main nozzle pieces 110 on either side, and when the main nozzle pieces 110 are swung inside the exhaust flow path 101, the coupling nozzle pieces 120 form projecting sections 102 inside the exhaust flow path 101.

15 Claims, 7 Drawing Sheets

(58) Field of Classification Search
USPC .................................. 60/264; 239/265.43
See application file for complete search history.

(56) References Cited

U.S. PATENT DOCUMENTS

| | | | | |
|---|---|---|---|---|
| 2,997,845 | A * | 8/1961 | Oulianoff | F02K 1/383 |
| | | | | 181/215 |
| 3,133,412 | A * | 5/1964 | Westley | F02K 1/42 |
| | | | | 60/230 |
| 3,258,913 | A * | 7/1966 | Moorehead | F02C 7/042 |
| | | | | 239/265.43 |
| 3,570,769 | A * | 3/1971 | Freeman | F02K 1/48 |
| | | | | 239/265.39 |
| 3,615,052 | A * | 10/1971 | Tumavicus | F02K 1/40 |
| | | | | 239/265.43 |
| 3,650,348 | A * | 3/1972 | Colebrook | F02K 1/40 |
| | | | | 181/215 |
| 3,973,731 | A * | 8/1976 | Thayer | F02K 1/12 |
| | | | | 239/265.39 |
| 4,638,947 | A * | 1/1987 | Jaqua | F02K 9/976 |
| | | | | 60/771 |
| 4,754,926 | A * | 7/1988 | Singer | F02K 9/976 |
| | | | | 239/265.11 |
| 4,878,617 | A * | 11/1989 | Novotny | F02K 1/008 |
| | | | | 60/228 |
| 5,941,065 | A * | 8/1999 | Lidstone | F02K 1/085 |
| | | | | 239/265.17 |
| 2007/0186535 | A1 | 8/2007 | Powell et al. | |
| 2011/0072781 | A1 | 3/2011 | Birch et al. | |
| 2011/0139540 | A1* | 6/2011 | Caruel | F02K 1/383 |
| | | | | 181/215 |
| 2013/0017065 | A1* | 1/2013 | Webster | F02K 1/46 |
| | | | | 415/148 |

FOREIGN PATENT DOCUMENTS

| | | |
|---|---|---|
| JP | 2007-285245 A | 11/2007 |
| JP | 2008-144764 A | 6/2008 |
| JP | 2014-009613 A | 1/2014 |

OTHER PUBLICATIONS

Oates, Gordon, C., "Aircraft Propulsion Systems Technology and design", AIAA Education Serios, American Institute of Aeronautics and Astronautics, Inc., Washington D.C., USA, 1989, pp. 301-303.

* cited by examiner

A: CONVERGENT-DIVERGENT NOZZLE

B: PLUG NOZZLE

C: ASYMMETRICAL NOZZLE

Related Art

EXHAUST NOZZLE AND METHOD FOR CHANGING EXHAUST FLOW PATH

BACKGROUND OF THE INVENTION

1. Field of the Invention

The present invention relates to an exhaust nozzle extending to the rear of an engine and constituting an exhaust flow path, and to a method for changing an exhaust flow path whereby a cross-sectional shape of an exhaust flow path extending to the rear of the engine is altered, and in particular, to an exhaust nozzle and a method for changing an exhaust flow path suitable for an engine of a supersonic aircraft.

2. Description of the Related Art

When high-pressure fluid, such as exhaust from an engine, is discharged from an exhaust nozzle, which forms an exhaust flow path, a high-speed fluid is created at the end of the nozzle, this high-speed fluid spreads while mixing with surrounding fluid according to a speed gradient with respect to the surrounding fluid, and noise is generated in this course of this mixing action.

In particular, in the exhaust portion of a jet engine in an aircraft or the like, the noise has high energy across a broad frequency band, and areas adjacent to an airport and the aircraft passengers suffer barely acceptable effects due to exposure to noise, especially during take-off and landing.

Therefore, it is conceivable that noise during take-off and landing could be reduced by restricting the mixing and spreading of the high-speed fluid and the surrounding fluid, through providing a movable portion in the exhaust nozzle to alter the shape and cross-sectional surface area of the exhaust flow path.

For example, in the technology revealed in Japanese Patent Application Publication No. 2007-285245, in order to reduce noise, the state of mixing of a core stream and a bypass stream is altered by composing a rear end of a core flow path of an exhaust nozzle attachably and detachably, or in a passively movable fashion, and disposing same to the upstream side of a rear end of a bypass flow path in order to.

Furthermore, in Japanese Patent Application Publication No. 2008-144764, in order to reduce noise, an opening is provided between a core flow path and a bypass flow path of an exhaust nozzle, and by opening and closing the opening with a passive or active movable mechanism, the state of mixing of the core stream and the bypass stream is altered.

Moreover, the technology is also known, according to which the state of mixing is changed by providing notch-shaped projections on an inner surface of an exhaust nozzle, in order to achieve noise reduction by modifying only the cross-sectional shape of the exhaust flow path of the exhaust nozzle without changing the path of a core stream and a bypass stream (see Tsutomu OISHI, "Jet Noise Reduction by Notched Nozzle on Japanese ECO engine project", AIAA Paper 2010-4026, etc.).

Furthermore, with a jet engine for an aircraft, if the cruising speed exceeds the speed of sound, as in a supersonic aircraft, then the propulsion efficiency is improved by providing a portion in which the cross-sectional area of the exhaust flow path gradually increases, toward the rear end side from a position where the cross-sectional area is smallest, but if the cruising speed is equal to or lower than the speed of sound, then the propulsion efficiency may be reduced if the cross-sectional area of the exhaust flow path is increased toward the rear end side from the position where the cross-sectional area is smallest.

Therefore, it is known that in supersonic aircraft, a movable portion is provided in the exhaust nozzle to alter the shape and cross-sectional area of the exhaust flow path, so as to obtain efficient propulsion during take-off and landing or when cruising at both subsonic speeds and supersonic speeds.

For instance, as shown in FIG. 11, Gordon C. Oates, "Aircraft Propulsion Systems Technology and Design", 301-303 discloses a convergent-divergent nozzle form (A); a plug nozzle form (B); and an axially asymmetrical nozzle form (C).

With the convergent-divergent nozzle form (A), a mechanism to open and close the nozzle end is provided, thereby altering the cross-sectional area of the nozzle end.

With the plug nozzle form (B), a mechanism is provided for expanding and contracting the core portion of the nozzle tip section in the radial direction, thereby changing the cross-sectional area of the tip section.

In an axially asymmetrical nozzle form (C), the cross-sectional area of the tip section is altered by combining a fixed wall and a movable wall, and displacing the movable wall in a radial direction in the form of a flap.

Moreover, with the object of reducing noise and improving efficiency when cruising at supersonic speeds, in Japanese Patent Application Publication No. H7-208262 and Japanese Patent Application Publication No. 2007-218255, an exhaust nozzle, including a bypass flow path, is constituted by a plurality of active movable mechanisms, and the shape and cross-sectional area of an exhaust flow path are altered, or a path of a core stream and a bypass stream are changed so as to alter the state of mixing of the core stream and the bypass stream.

The technology disclosed in Japanese Patent Application Publication No. 2007-285245 and Japanese Patent Application Publication No. 2008-144764 and Tsutomu OISHI, "Jet Noise Reduction by Notched Nozzle on Japanese ECO engine project", AIAA Paper 2010-4026 makes no mention at all of efficiency when cruising at supersonic speeds, and if these common technologies are applied to a supersonic aircraft, then in order to improve efficiency when cruising at supersonic speeds, in addition to the movable mechanism of the exhaust nozzle, increases in complexity and size are required.

Furthermore, it is also necessary to consider whether or not an improvement in propulsion is obtained which is sufficient to compensate for the increase in complexity and size, and therefore it has been difficult to improve efficiency in a practicable fashion, simply by combining the structure for noise reduction disclosed in Japanese Patent Application Publication No. 2007-285245 and Japanese Patent Application Publication No. 2008-144764, and the like, and the mechanism for improving efficiency during supersonic cruising disclosed in Tsutomu OISHI, "Jet Noise Reduction by Notched Nozzle on Japanese ECO engine project", AIAA Paper 2010-4026, and the like.

The technology disclosed in Japanese Patent Application Publication No. H7-208262 includes a pair of first flaps A which can swing about a first horizontal axle, a pair of second flaps B which can swing about a second horizontal axle, a pair of lobe-shaped mixers M which are pivotally mounted on a third horizontal axle at the downstream end of the first flap A and which deploy horizontally in a linear shape, and a pair of third flaps C which can swing about a fourth horizontal axle, wherein the mixers M have a fifth horizontal axle, this fifth horizontal axle is coupled to the fourth horizontal axle via a link, and the fourth horizontal axle is provided movably along a guide provided on the side wall.

Furthermore, in the technology disclosed in Japanese Patent Application Publication No. 2007-218255, the first exhaust nozzle and the second exhaust nozzle are composed in such a manner that the variable cross-sectional area can be manipulated, the two nozzles have corresponding actuators which are coupled suitably to an engine controller in the form of a digital computer, and the engine controller suitably adjusts the discharge flow rate range according to the requirements for efficient operation of the engine in the operating cycles of the aircraft and the flight envelope.

These compositions are complex, and by providing these mechanisms, the weight is increased, and therefore even if an increase in propulsion that compensates for this weight increase is achieved, the improvement in efficiency during supersonic cruising is slight, and there is a problem in that it is impossible to avoid increase in manufacturing costs due to increased complexity and size, and increased labor time due to maintenance and inspection.

SUMMARY OF THE INVENTION

Therefore, it is an object of the present invention to provide an exhaust nozzle and a method for changing an exhaust flow path, whereby noise can be reduced by using a simple and light-weight mechanism without increasing the complexity and size of the structure of the exhaust nozzle, and furthermore the efficiency during cruising at supersonic speeds can be improved.

The exhaust nozzle relating to the present invention resolves the problem described above by an exhaust nozzle extending to the rear of an engine and constituting an exhaust flow path, wherein the exhaust nozzle has a plurality of main nozzle pieces and at least one coupling nozzle piece; a rear end portion of each of the main nozzle pieces is provided swingably in an inward and outward direction of the exhaust flow path about an open/close bend section to the rear of the engine; the coupling nozzle piece is disposed between adjacent main nozzle pieces and is coupled bendably to the main nozzle pieces on either side thereof; when the main nozzle pieces are swung outward from the exhaust flow path, the coupling nozzle piece forms a flat surface having no projecting section inside the exhaust flow path; and when the main nozzle pieces are swung inside the exhaust flow path, the coupling nozzle piece forms a projecting section inside the exhaust flow path.

The method of changing an exhaust flow path relating to the present invention resolves the aforementioned problem by an exhaust flow path changing method for changing a cross-sectional shape of an exhaust flow path inside an exhaust nozzle extending to the rear of an engine, wherein the cross-sectional area of a rear end portion of the exhaust flow path is changed between a first state where the area is narrowest and a second state where the area is broadest by making the exhaust nozzle movable; and in the first state, a portion inside the exhaust flow path projects, and in the second state, no portion inside the exhaust flow path projects and the cross-sectional area of the exhaust flow path broadens toward the rear end portion.

According to the exhaust nozzle relating to claim 1 and the method for changing an exhaust flow path relating to claim 6, by changing between a first state where a portion inside the exhaust flow path projects and a notch-shaped projection appears on the inner surface side, and a second state where no portion inside the exhaust flow path projects and the cross-sectional area of the exhaust flow path becomes broader toward the rear end portion, it is possible to achieve both a noise reducing effect during take-off and landing in the first state, and improvement of efficiency during cruising at supersonic speeds in the second state.

Furthermore, it is possible to reduce noise, as well as being able to improve efficiency during cruising at supersonic speeds, simply by a change in the cross-sectional shape of the exhaust flow path between the first state and the second state, but without any change, or the like, in the flow path, and without any increase in the complexity and size of the structure of the exhaust nozzle.

Moreover, according to the exhaust nozzle relating to claim 1, only the open/close bending sections of the main nozzle pieces need to be actively movable, and the bend sections between the main nozzle pieces and the coupling nozzle pieces bend automatically due to the swinging action of the main nozzle pieces, whereby the cross-sectional shape of the exhaust flow path can be changed, and hence a simple and light-weight mechanism can be achieved, without any increase in the size or complexity of the structure of the exhaust nozzle.

According to the composition described in claim 2, when the main nozzle pieces are swung inside the exhaust flow path, the cross-sectional area of the rear end portion of the exhaust flow path is no more than the cross-sectional area at the position of the open/close bend section of the exhaust flow path, whereby it is possible to prevent noise by means of the notch-shaped projection on the inner surface side created by the coupling nozzle piece when in the first state, while also improving the propulsion efficiency at subsonic speeds, such as during take-off and landing, by creating a convergent shape toward the rear end side.

According to the composition described in claim 3, since the coupling nozzle piece is coupled bendably to the main nozzle pieces in side bend sections, and has a central bend section forming a projecting end, then when the notch-shaped projecting section on the inner surface side protrudes or retracts upon changing between the first state and the second state, hardly any bending force is applied to any region apart from the bending section of the coupling nozzle piece, and therefore the cross-sectional shape of the exhaust flow path changes smoothly, and furthermore a simple and light-weight mechanism can be achieved.

According to the composition described in claim 4, by using hinged coupling means for the open/close bend section, the side bend section and the central bend section, then when the notch-shaped projecting section on the inner surface side protrudes or retracts upon changing between the first state and the second state, there is no repeated deformation of the bend section, and the cross-sectional shape of the exhaust flow path can be changed smoothly with light force.

According to the composition described in claim 5, since the plurality of main nozzle pieces and the coupling nozzle piece constitute the whole circumference of the exhaust flow path to the rear of the engine, then it is possible to uniformly change the cross-sectional shape of the exhaust flow path through the whole circumference, and the propulsion efficiency can be improved further.

DESCRIPTION OF THE PREFERRED EMBODIMENTS

Figure 1:
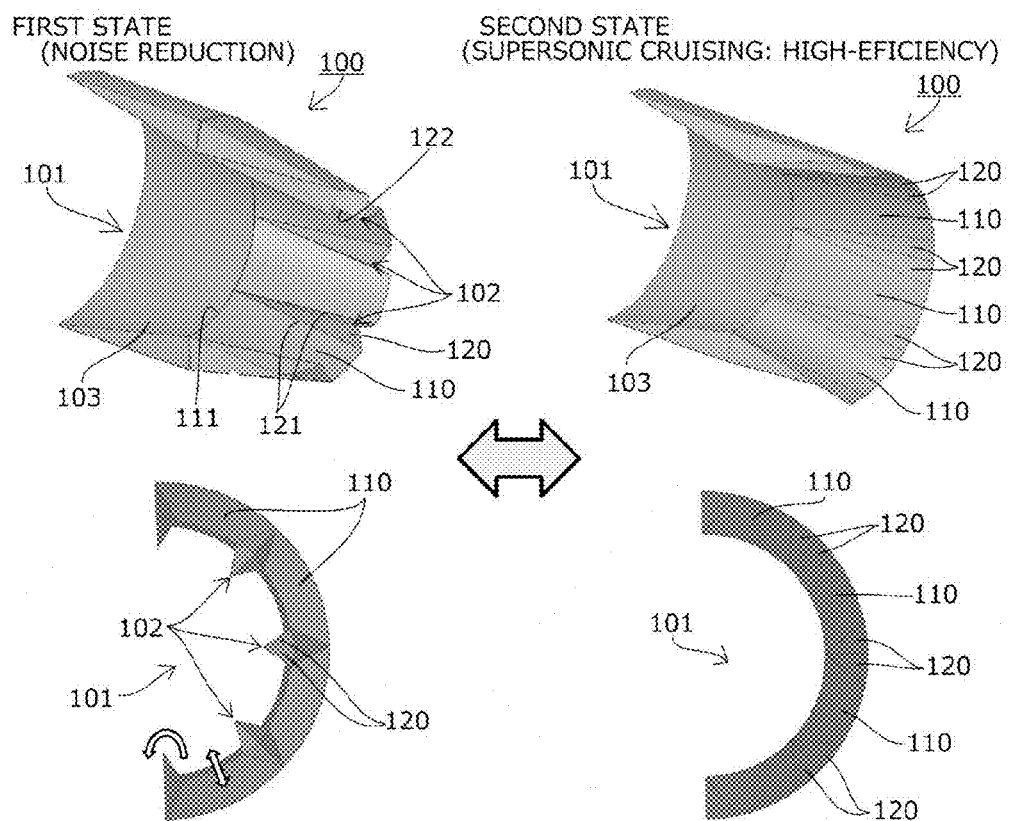
FIG. 1 is an illustrative diagram of change in the cross-sectional shape of the exhaust flow path relating to one embodiment of the present invention.

The exhaust nozzle according to the present invention is an exhaust nozzle extending to the rear of an engine and constituting an exhaust flow path, wherein the exhaust nozzle has a plurality of main nozzle pieces and at least one coupling nozzle piece; a rear end portion of each of the main nozzle pieces is provided swingably in an inward and outward direction of the exhaust flow path about an open/close bend section to the rear of the engine; the coupling nozzle piece is disposed between adjacent main nozzle pieces and is coupled bendably to the main nozzle pieces on either side thereof; when the main nozzle pieces are swung outward from the exhaust flow path, the coupling nozzle piece forms a flat surface having no projecting section inside the exhaust flow path; and when the main nozzle pieces are swung inside the exhaust flow path, the coupling nozzle piece forms a projecting section inside the exhaust flow path. The invention may be implemented by any embodiment, provided that noise can thereby be reduced by using a simple and light-weight mechanism without increase in the size or complexity of the structure of the exhaust nozzle, as well as being able to improve efficiency during cruising at supersonic speeds.

Furthermore, the method for changing an exhaust flow path according to the present invention changes a cross-sectional shape of an exhaust flow path inside an exhaust nozzle extending to the rear of an engine, wherein the cross-sectional area of a rear end portion of the exhaust flow path is changed between a first state where the area is narrowest and a second state where the area is broadest by making the exhaust nozzle movable; and in the first state, a portion inside the exhaust flow path projects, and in the second state, no portion inside the exhaust flow path projects and the cross-sectional area of the exhaust flow path broadens toward the rear end portion. The invention may be implemented by any embodiment, provided that noise can thereby be reduced by using a simple and light-weight mechanism without increase in the size or complexity of the structure of the exhaust nozzle, as well as being able to improve efficiency during cruising at supersonic speeds.

The exhaust nozzle 100 relating to one embodiment of the present invention has a plurality of main nozzle pieces 110, each provided in such a manner that a rear end side thereof is swingable in an inward and outward direction of an exhaust flow path 101 about an open/close bend section 111 at the rear of an engine, and a plurality of coupling nozzle pieces 120 provided between adjacent main nozzle pieces 110, the plurality of main nozzle pieces 110 and the coupling nozzle pieces 120 constituting the whole circumference of the exhaust flow path 101 to the rear of the engine.

The main nozzle pieces 110 are composed so as to be swingable by actuators (not illustrated) about the open/close bend section 111 at the rear end of a throttle section 103, and by swinging movement of the main nozzle pieces 110, the nozzle is changed between a first state in which the cross-sectional area of the rear end portion of the exhaust flow path 101 shown on the left-hand side in FIG. 1 is narrowest and a second state in which the cross-sectional area of the rear end portion of the exhaust flow path 101 shown on the right-hand side in FIG. 1 is broadest. In the first state, the coupling nozzle pieces 120 curve and project into the exhaust flow path 101, and in the second state, the coupling nozzle pieces 120 do not project into the exhaust flow path 101 and the cross-sectional area of the exhaust flow path 101 becomes broader toward the rear end.

Figure 2:
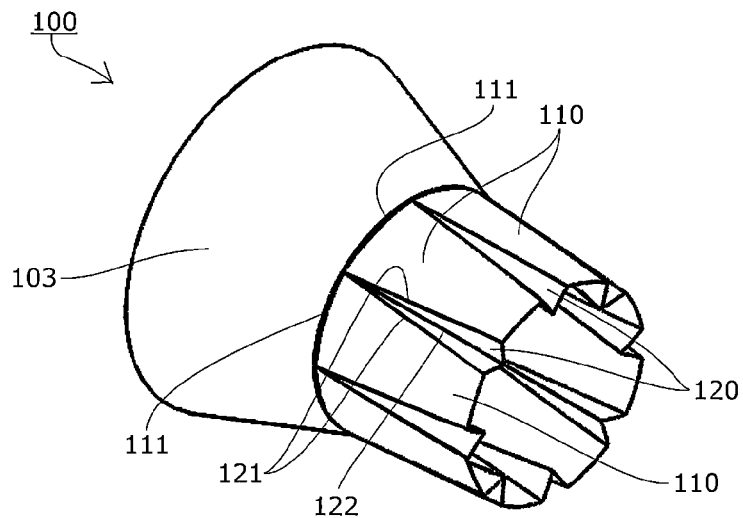
FIG. 2 is a schematic perspective diagram in a first state of the exhaust nozzle relating to one embodiment of the present invention.
Figure 3:
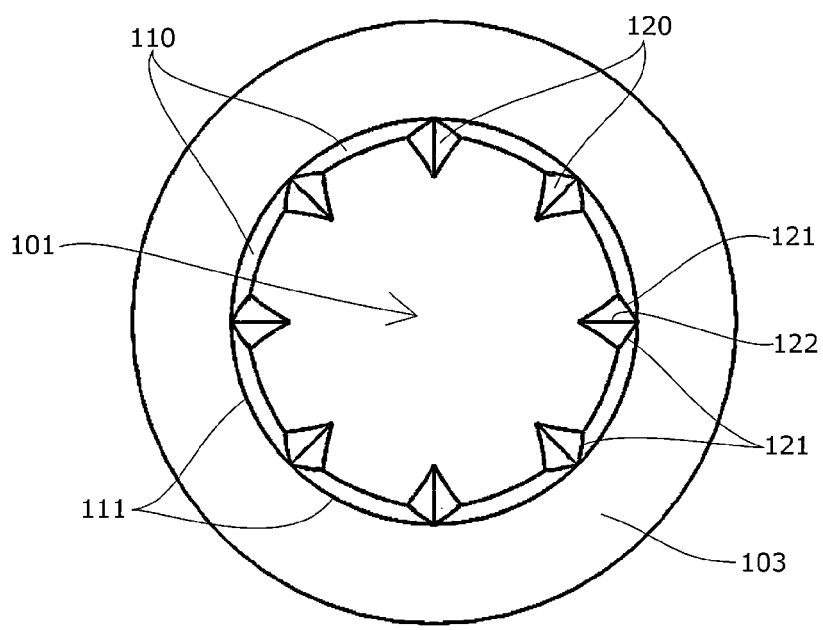
FIG. 3 is a front face diagram viewed from the exhaust side in FIG. 2.
Figure 4:
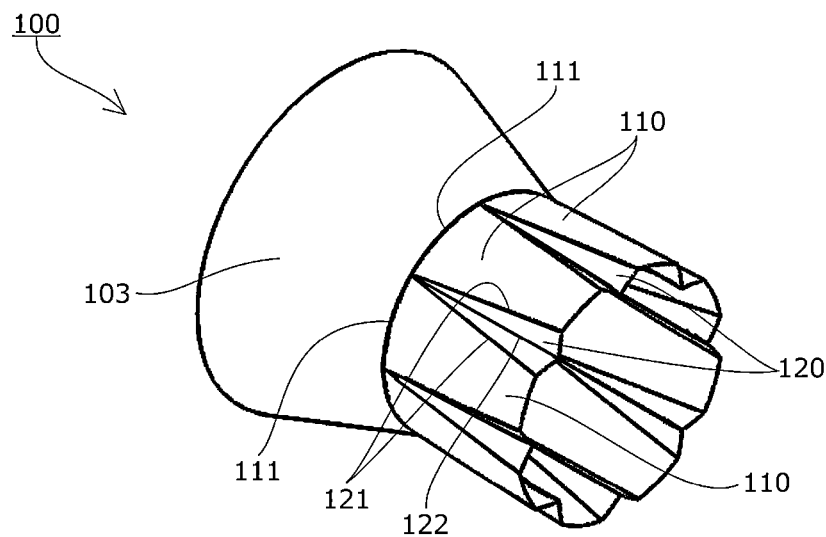
FIG. 4 is a schematic perspective diagram of an intermediate state between a first state and a second state of the exhaust nozzle relating to one embodiment of the present invention.
Figure 5:
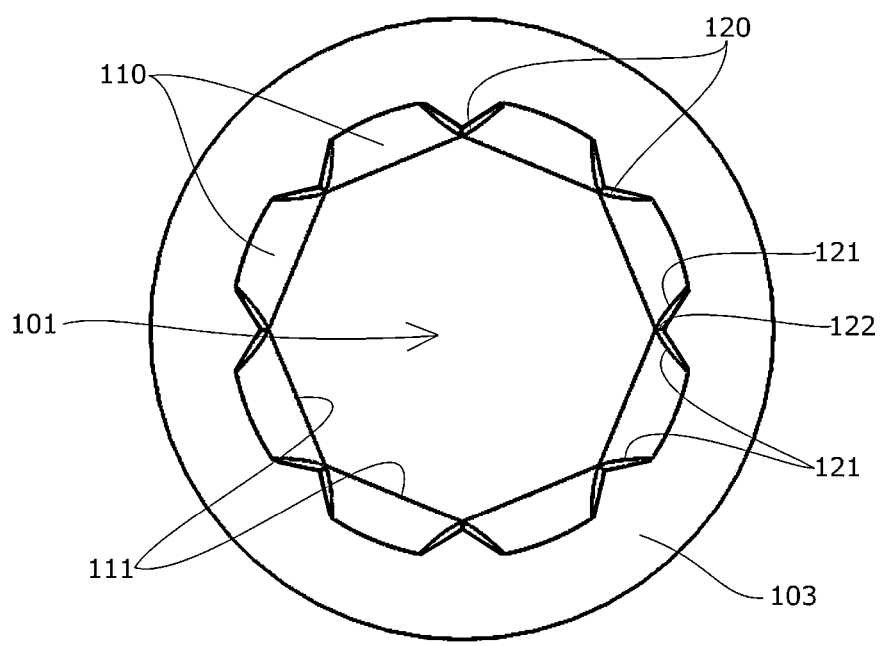
FIG. 5 is a front face diagram viewed from the exhaust side in FIG. 4.
Figure 6:
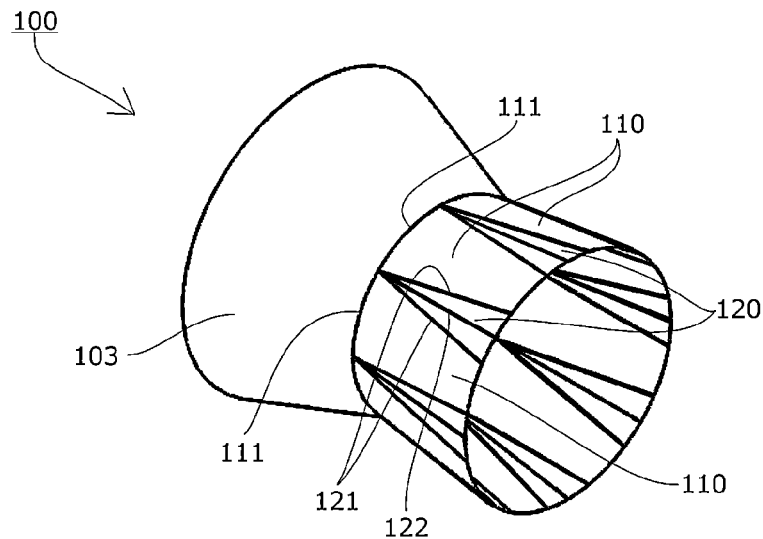
FIG. 6 is a schematic perspective diagram in a second state of the exhaust nozzle relating to one embodiment of the present invention.
Figure 7:
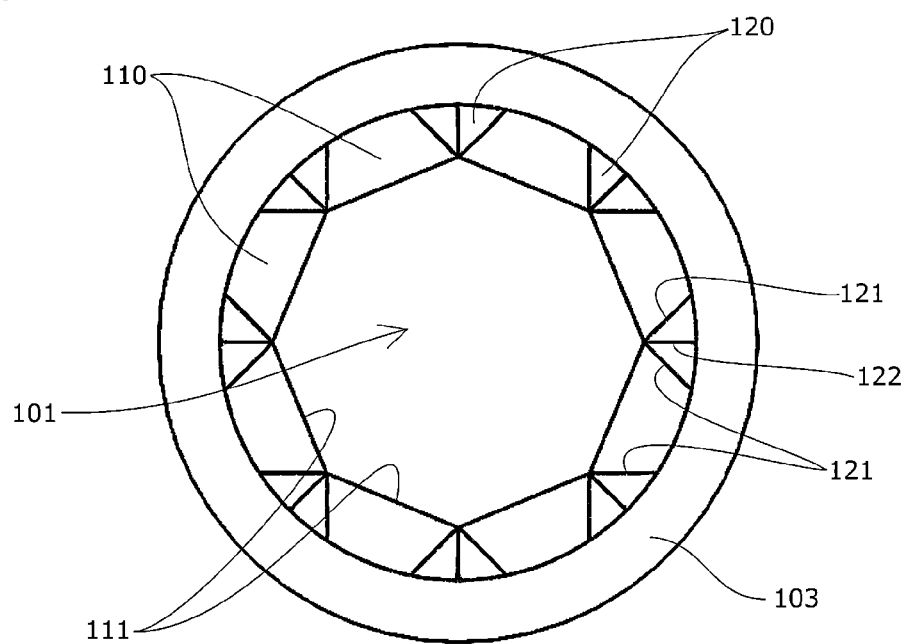
FIG. 7 is a front face diagram viewed from the exhaust side in FIG. 6.

The exhaust nozzle 100 relating to one embodiment of the present invention is described here with reference to FIG. 2 and FIG. 3 which show the first state, FIG. 4 and FIG. 5 which show an intermediate state between the first state and the second state, and FIG. 6 and FIG. 7 which show the second state.

FIG. 2 to FIG. 7 do not illustrate the shape of the main nozzle pieces 110 and the coupling nozzle pieces 120 in the thickness direction, and depict a uniform thin plate which specifies only the inner surface side of the exhaust flow path 101.

In the present embodiment, the throttle section 103 is formed in a truncated conical shape in which the cross-sectional area becomes smallest at the rear end, the open/close bend section 111 is formed at the rear end of the throttle section 103, and eight main nozzle pieces 110 are provided through the whole circumference of the nozzle. The open/close bend section 111 is composed by hinged coupling of the throttle section 103 and the main nozzle pieces 110.

The main nozzle pieces 110 are formed in such a manner that the width thereof in the circumferential direction becomes smaller, from the open/close bend section 111 toward the rear end, and the coupling nozzle pieces 120 which are bendable toward the inside of the exhaust flow path are provided respectively between adjacent main nozzle pieces 110.

The coupling nozzle pieces 120 are bendably coupled to the main nozzle pieces 110 on either side by side bend sections 121 and each have a central bend section 122 forming a projecting end in a central position thereof.

In the present embodiment, the coupling nozzle pieces 120 are each composed by two members which are coupled by a hinge at the central bend section 122, and the side bend sections 121 are also coupled by a hinge.

In the first state where the main nozzle pieces 110 are in a position of having swung furthest inside the exhaust flow path 101, and the cross-sectional area of the rear end section of the exhaust flow path 101 is narrowest, as shown in FIG.

2 and FIG. 3, the rear portions of the main nozzle pieces 110 are positioned slightly toward the inside of the exhaust flow path 101 from the open/close bend section 111, and furthermore, viewed from the outer circumference of the exhaust nozzle 100, the coupling nozzle pieces 120 each assume a state where the side bend sections 121 are folded in a large peak shape, the central bend section 122 is folded in a large valley shape, and the portion of the central bend section 122 creates a projecting section 102 which projects inside the exhaust flow path 101.

From the state described above, if the main nozzle pieces 110 are swung toward the outside of the exhaust flow path 101 by the actuators (not illustrated), then as shown in FIG. 4 and FIG. 5, the rear end portions of the main nozzle pieces 110 perform an outward broadening movement, and in conjunction with this, the peak fold state of the side bend sections 121 of the coupling nozzle pieces 120 and the valley fold state of the central bend sections 122 are gradually reduced, and the projecting sections 102 where the portions of the central bend sections 122 project inside the exhaust flow path 101 become smaller.

In the second state where the main nozzle pieces 110 are in a position of having swung furthest outward from the exhaust flow path 101 and the cross-sectional area of the rear end portion of the exhaust flow path 101 is broadest, as shown in FIG. 6 and FIG. 7, there is no bend in the central bend sections 122 of the coupling nozzle pieces 120, there are no projecting sections 102 projecting inside the exhaust flow path 101, and the portion rearwards from the open/close bend section 111 has a shape approximating that of a truncated cone in which the cross-sectional area becomes greatest at the rear end, due to the rear end portions of the main nozzle pieces 110 and the coupling nozzle pieces 120.

From the state described above, when the main nozzle pieces 110 are swung to inside the exhaust flow path 101 by the actuators (not illustrated), then the nozzle passes through the states shown in FIG. 4 and FIG. 5, and assumes the first state shown in FIG. 2 and FIG. 3.

The shape and thickness of the outer circumferential side of the throttle section 103, the main nozzle pieces 110 and the coupling nozzle pieces 120 should be designed appropriately to account for the aerodynamic properties during flight.

Furthermore, as shown in FIG. 1, by forming the outer circumference side of the coupling nozzle pieces 120 with a triangular conical shape, it is possible to specify the bending limits of the central bend sections 122 and the side bend sections 121, and the first state and the second state described above can be guaranteed reliably.

Figure 8:
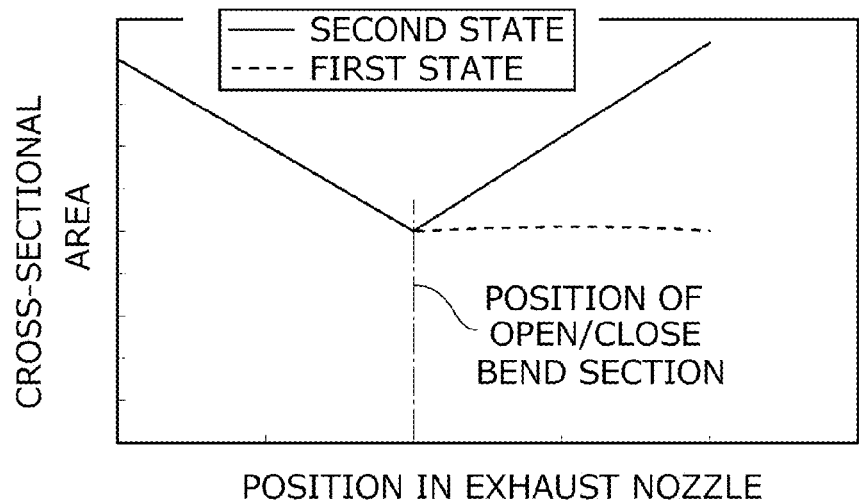
FIG. 8 is a graph of the cross-sectional shape of the exhaust flow path relating to one embodiment of the present invention.

FIG. 8 shows the distribution of the cross-sectional area of the exhaust flow path 101 which changes with the exhaust nozzle 100.

In the first state, as indicated by the dotted line, a convergent cross-sectional area distribution which is suited to take-off and landing is obtained to the rear of the position of the open/close bend section 111, and in the second state, as indicated by the solid line, a convergent-divergent cross-sectional area distribution which is suited to cruising at supersonic speeds is obtained to the rear of the position of the open/close bend section 111.

Furthermore, as shown in FIG. 1 to FIG. 3, in the first state, the shape of the exhaust flow is bent into a notched shape by creating projecting sections 102 due to the coupling nozzle pieces 120 bending inside the exhaust flow path 101.

Figure 9:
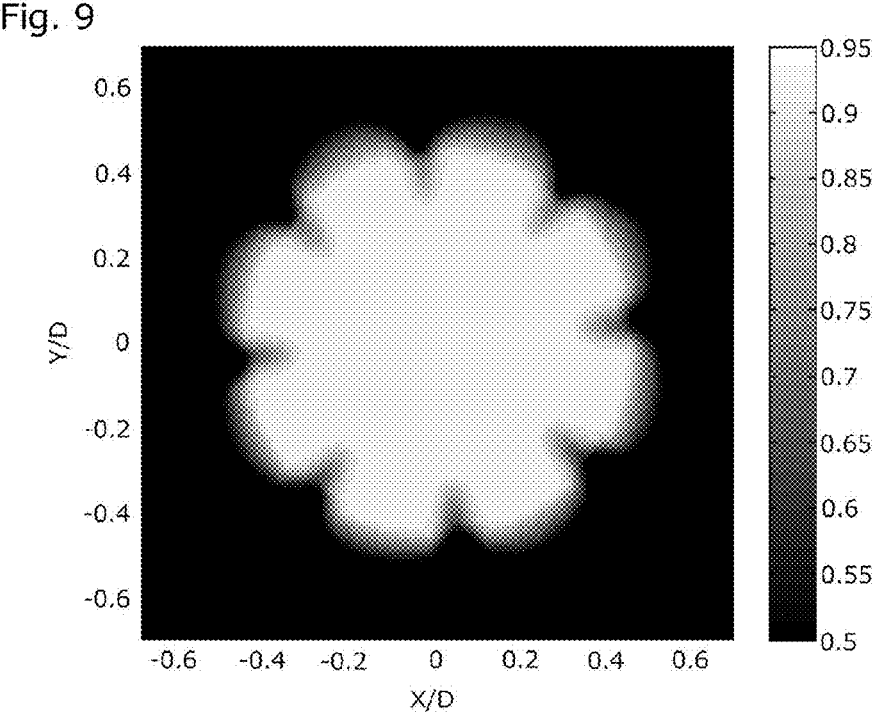
FIG. 9 is Mach speed distribution diagram of exhaust gas in a first state of the exhaust nozzle relating to one embodiment of the present invention.

The Mach speed distribution of the exhaust jet obtained by experimentation with a reduced scale model having an exhaust opening diameter of 28.8 mm was a notched distribution, as shown in FIG. 9.

Therefore, mixing of the exhaust flow and the external air flow is promoted and noise reduction can be achieved.

Figure 10:
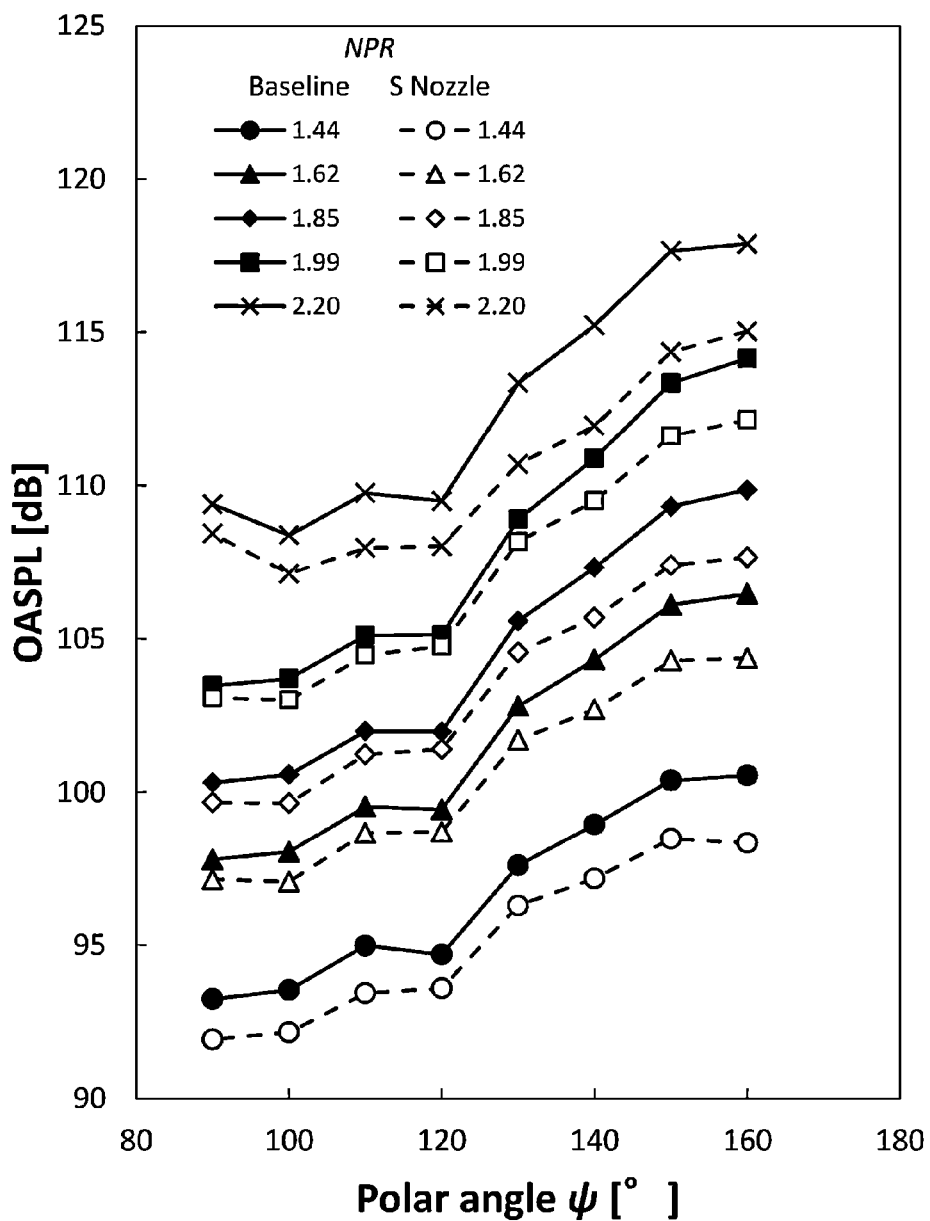
FIG. 10 is a noise measurement graph of an exhaust nozzle relating to one embodiment of the present invention.

FIG. 10 shows the results of comparing the radiated sound pressure level with a conventional convergent nozzle of the same outlet surface area, which does not have projecting sections.

The experiment conditions were such that the nozzle temperature ratio is 1 and the distance to the measurement position is 50 times the diameter.

The horizontal axis represents an angle from the inflow surface, the vertical axis represents an overall sound pressure level, and the graph depicts the respective values obtained when the nozzle pressure ratio, in other words, the Mach speed of the exhaust flow is changed.

The solid line indicates measurement results for a conventional convergent nozzle, and the dotted line indicates measurement results for an exhaust nozzle relating to the present invention.

As these results reveal, with the same opening surface area, the exhaust nozzle according to the present invention which has projecting sections 102 has a lower sound pressure level than a conventional convergent nozzle which has no projecting sections, and hence is effective in reducing noise, for instance, during take-off and landing.

As described above, according to the present invention, noise can be reduced by using a simple and light-weight mechanism without increasing the complexity and size of the structure of the exhaust nozzle, and furthermore, the efficiency during cruising at supersonic speeds can be improved.

In the embodiment described above, there are eight main nozzle pieces 110, but the number thereof is not limited to this.

Furthermore, the plurality of main nozzle pieces and the coupling nozzle pieces constitute the full circumference of the exhaust flow path to the rear of the engine, but it is also possible to adopt a structure in which a fixed piece is provided in the circumferential direction of the exhaust nozzle, and a prescribed plurality of main nozzle pieces and coupling nozzle pieces are provided partially in the remainder of the nozzle.

Figure 11:
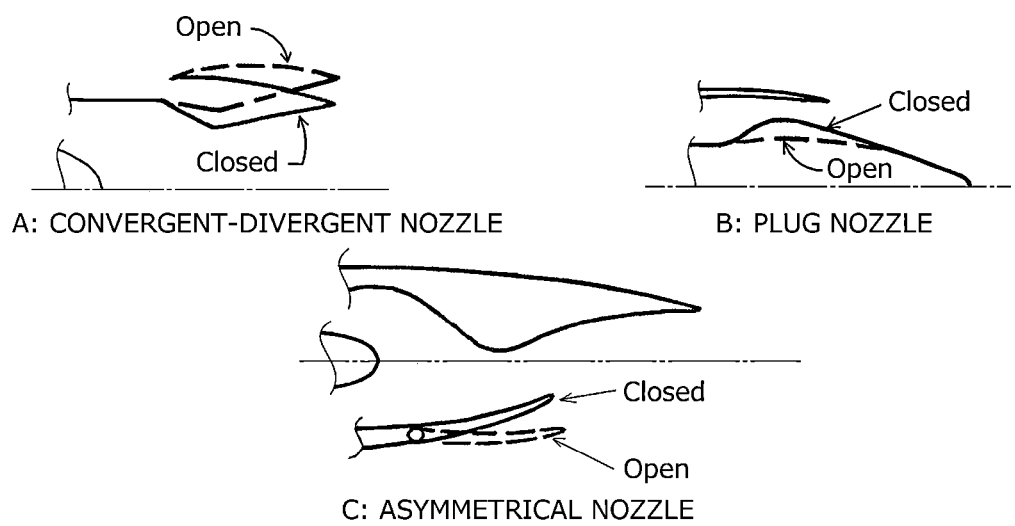
FIG. 11 is an illustrative diagram of an exhaust nozzle of a conventional supersonic aircraft.

For example, it is also possible to adopt a structure in which the movable portions of an axially asymmetrical nozzle shape in FIG. 11C described above are provided with a prescribed plurality of main nozzle pieces and coupling nozzle pieces.

What is claimed is:

1. An exhaust nozzle extending to the rear of an engine and constituting an exhaust flow path,
   wherein the exhaust nozzle has a throttle section, a plurality of main nozzle pieces and at least one coupling nozzle piece,
   the throttle section is formed in a truncated conical shape in which a cross-sectional area becomes smallest at a rear end of the throttle section,
   a rear end portion of each of the main nozzle pieces is provided swingably in an inward and outward direction of the exhaust flow path about an open/close bend section to the rear of the engine, and the open/close bend section is formed at the rear end of the throttle section of the engine,
   the coupling nozzle piece is disposed between adjacent main nozzle pieces and is coupled bendably to the main nozzle pieces on either side thereof, the coupling nozzle piece is coupled bendably to the main nozzle pieces at a side bend section, and the coupling nozzle piece has a central bend section which is capable of forming a bent projecting section inside the exhaust flow path in conjunction with a movement of each of the main nozzle pieces, when the main nozzle pieces are swung outward from the exhaust flow path, the coupling nozzle piece forms a flat surface having no projecting section inside the exhaust flow path, and the cross-sectional area of the rear end portion of the exhaust flow path is wider than the cross-sectional area at the position of the open/close bend section of the exhaust flow path, and when the main nozzle pieces are swung inside the exhaust flow path, the coupling nozzle piece forms the bent projecting section inside the exhaust flow path.

2. The exhaust nozzle according to claim 1, wherein, when the main nozzle pieces are swung inside the exhaust flow path, the cross-sectional area of the rear end portion of the exhaust flow path is no more than the cross-sectional area at the position of the open/close bend section of the exhaust flow path.

3. The exhaust nozzle according to claim 1, wherein each of the open/close bend section, the side bend section and the central bend section has a hinge.

4. The exhaust nozzle according to claim 1, wherein the plurality of main nozzle pieces and the coupling nozzle pieces constitute the exhaust nozzle, and the exhaust nozzle constitutes the whole circumference of the exhaust flow path to the rear of the engine.

5. The exhaust nozzle according to claim 4, wherein,
the exhaust nozzle has three or more coupling nozzle pieces,
each of the open/close bend section extends to the circumferential direction of the exhaust flow path at the rear of the throttle section,
each of the main nozzle pieces has a rear end edge portion extending the circumferential direction at the rear end portion of the exhaust flow path,
each of the coupling nozzle pieces is coupled bendably to the main nozzle pieces from a line connecting a first end portion of the open/close bend section in the circumferential direction to a second end portion of the rear end edge portion in the circumferential direction,
when the main nozzle pieces are swung inside the exhaust flow path, the coupling nozzle piece forms the bent projecting section inside the exhaust flow path has a shape approximating that of a truncated cone formed by the main nozzle pieces.

6. The exhaust nozzle according to claim 1, wherein, when the main nozzle pieces are swung inside the exhaust flow path and the rear end portion of the exhaust flow path is narrowest, the cross-sectional area of each portion from the position of the open/close bend section of the exhaust flow path to the rear end portion of the exhaust flow path is substantially constant.

7. The exhaust nozzle according to claim 1, wherein,
the main nozzle pieces are swung by driving force from outside, and
the coupling nozzle pieces are bended by swinging movement of the main nozzle pieces.

8. The exhaust nozzle according to claim 1, wherein,
the bent projecting section inside the exhaust flow path formed by the coupling nozzle pieces forms a triangular conical shape.

9. The exhaust nozzle according to claim 8, wherein,
the coupling nozzle pieces form the bent projecting section with the triangular conical shape so that a Mach speed distribution of exhaust jet exhausted from the rear end portion of the exhaust flow path is a notched distribution.

10. An exhaust nozzle extending to the rear of an engine of a supersonic aircraft and constituting an exhaust flow path, the exhaust nozzle comprising:
a throttle section;
a plurality of main nozzle pieces; and
at least one coupling nozzle piece, wherein,
the throttle section is formed in a truncated conical shape in which a cross-sectional area becomes smallest at a rear end of the throttle section,
a rear end portion of each of the main nozzle pieces is provided swingably in an inward and outward direction of the exhaust flow path about an open/close bend section to the rear of the engine, and the open/close bend section is formed at the rear end of the throttle section,
the coupling nozzle piece is disposed between adjacent main nozzle pieces and is coupled bendably to the main nozzle pieces from either side thereof, the coupling nozzle piece is coupled bendably to the main nozzle pieces at a side bend section, and the coupling nozzle piece has a central bend section which is capable of forming a bent projecting section inside the exhaust flow path in conjunction with a movement of each of the main nozzle pieces,
when the supersonic aircraft cruises at supersonic speeds, the main nozzle pieces are swung outward from the exhaust flow path, the coupling nozzle piece forms a flat surface having no projecting section inside the exhaust flow path, and the cross-sectional area of the rear end portion of the exhaust flow path is wider than the cross-sectional area at the position of the open/close bend section of the exhaust flow path, and
when the supersonic aircraft takes off and lands, the main nozzle pieces are swung inside the exhaust flow path and the coupling nozzle piece forms the bent projecting section inside the exhaust flow path.

11. The exhaust nozzle according to claim 10, wherein, when the supersonic aircraft takes off and lands, the main nozzle pieces are swung inside the exhaust flow path and the cross-sectional area of the rear end portion of the exhaust flow path is no more than the cross-sectional area at the position of the open/close bend section of the exhaust flow path.

12. The exhaust nozzle according to claim 10, wherein each of the open/close bend section, the side bend section and the central bend section has a hinge.

13. The exhaust nozzle according to claim 10, wherein the plurality of main nozzle pieces and the coupling nozzle pieces constitute the exhaust nozzle, and the exhaust nozzle constitutes the whole circumference of the exhaust flow path to the rear of the engine.

14. The exhaust nozzle according to claim 10, wherein, when the supersonic aircraft takes off and lands, the main nozzle pieces are swung inside the exhaust flow path and the rear end portion of the exhaust flow path is narrowest and the cross-sectional area of each portion from the position of the open/close bend section of the exhaust flow path to the rear end portion of the exhaust flow path is substantially constant.

15. The exhaust nozzle according to claim 13, wherein,
the exhaust nozzle has three or more coupling nozzle pieces, each of the open/close bend section extends to the circumferential direction of the exhaust flow path at the rear of the throttle section, each of the main nozzle pieces has a rear end edge portion extending the circumferential direction at the rear end portion of the exhaust flow path, each of the coupling nozzle pieces is coupled bendably to the main nozzle pieces from a line connecting a first end portion of the open/close bend section in the circumferential direction to a second end portion of the rear end edge portion in the circumferential direction, when the supersonic aircraft takes off and lands, the main nozzle pieces are swung inside the exhaust flow path and the coupling nozzle piece forms the bent projecting section inside the exhaust flow path has a shape approximating that of a truncated cone formed by the main nozzle pieces.

\* \* \* \* \*